United States Patent [19]

Sanderson

[11] 4,050,426

[45] Sept. 27, 1977

[54] METHOD AND APPARATUS FOR TREATING LIQUID FUEL

[76] Inventor: Charles H. Sanderson, 3717 Frictcha Ave., Fort Wayne, Ind. 46806

[21] Appl. No.: 612,212

[22] Filed: Sept. 10, 1975

Related U.S. Application Data

[63] Continuation-in-part of Ser. No. 518,243, Oct. 29, 1974, Pat. No. 3,951,807, which is a continuation-in-part of Ser. No. 399,164, Sept. 20, 1973, abandoned.

[51] Int. Cl.[2] ...................... F02B 75/10; B01D 35/06; F23D 21/00

[52] U.S. Cl. ................................ 123/119 E; 210/222; 335/209; 431/356

[58] Field of Search .................... 123/119 E; 335/302, 335/303, 306, 209; 210/222; 431/356, 253; 261/72, 74, 75

[56] References Cited

U.S. PATENT DOCUMENTS

| | | | |
|---|---|---|---|
| 2,825,464 | 3/1958 | Mack | 210/222 |
| 2,926,276 | 2/1960 | Moriya et al. | 313/153 |
| 2,959,832 | 11/1960 | Baermann | 335/303 X |
| 3,059,910 | 10/1962 | Moriya | 261/72 |
| 3,116,726 | 1/1964 | Kwartz | 123/119 E |
| 3,127,544 | 3/1964 | Blume, Jr. | 335/306 X |
| 3,177,633 | 4/1965 | McDonald, Jr. | 55/100 |
| 3,228,868 | 1/1966 | Ruskin | 123/119 E |
| 3,241,198 | 3/1961 | Baermann | 335/303 |
| 3,349,354 | 10/1967 | Miyata | 335/209 |
| 3,669,274 | 6/1972 | Happ et al. | 210/222 |
| 3,830,621 | 8/1974 | Miller | 431/356 |

*Primary Examiner*—Wendell E. Burns
*Attorney, Agent, or Firm*—Shlesinger, Arkwright, Garvey & Dinsmore

[57] ABSTRACT

A method and apparatus for treating liquid fuel in an internal combustion engine. The fuel treating device is connected in the fuel line leading to the carburetor or other fuel/air mixing apparatus and comprises an elongated hollow outer casing made of a magnetic material, an elongated inner casing made of non-magnetic material positioned within the outer casing and a single elongated magnet received in the inner casing, the maget having at least three longitudinally spaced apart sections of alternating, north and south polarity. Means are provided for supporting the inner casing in spaced relation to the outer casing to form an annular chamber therebetween, in which chamber the lines of flux are preferably radial. The device further includes an inlet and an outlet located near opposite ends of the annular chamber for providing fluid flow from the fuel line through the chamber.

14 Claims, 4 Drawing Figures

METHOD AND APPARATUS FOR TREATING LIQUID FUEL

The present application is a continuation-in-part of my copending U.S. Pat. application Ser. No. 518,243 filed Oct. 29, 1974, now U.S. Pat. No. 3,951,807 which is a continuation-in-part of U.S. Pat. application Ser. No. 399,164 filed Sept. 20, 1973, now abandoned.

BACKGROUND OF THE INVENTION

The present invention relates to a method and apparatus for treating liquid fuel in internal combustion engines by passing it through a magnetic field prior to mixing it with air in the carburetor or the fuel injector.

One of the greatest problems facing industrialized society today is that of air pollution which has increased drastically in recent years due to the expanded use of machines and devices powered by electricity and internal combustion engines. One of the primary causes for this significant decrease in air quality in and around large cities is the increasing prevalence of vehicles powered by gasoline and diesel engines. Although there has been an effort in the part of the government and private industry to manufacture cars and trucks which emit less pollutants, this effort has been largely unsuccessful because the primary emphasis has been on the treatment of exhaust rather than on devising a way to burn the fuel more efficiently thereby inherently resulting in the emission of fewer waste products.

Another problem which is rapidly approaching crisis proportions is that of energy conservation, especially in the area of petroleum and petroleum-based fuels. Since the automobile is perhaps the largest consumer of petroleum today, significant conservation of gasoline could be realized if the combustion process were more efficient thereby producing a greater amount of work for an equal quantity of fuel consumed. A beneficial result of a more efficient combustion process is that the fuel is burned more completely so that fewer hydrocarbon waste products are emitted in the exhaust gases.

OBJECTS OF THE INVENTION

It is, therefore, an object of this invention to provide a method and apparatus for treating liquid fuel in an internal combustion engine which results in the reduction of harmful exhaust emissions, such as carbon monoxide, without reducing engine performance or efficiency.

Another object of this invention is to provide a method and apparatus for treating liquid fuel in an internal combustion engine whereby more efficient combustion is effected thereby resulting in greater mileage.

A further object of this invention is to provide a method and apparatus for treating liquid fuel in an internal combustion engine which reduces carbon build-up on spark plugs and other engine parts susceptible to this condition.

A still further object of this invention is to provide a method and apparatus for treating liquid fuel in an internal combustion engine which improves the performance of the engine without necessitating modifications thereto.

Yet another object of this invention is to provide a relatively inexpensive apparatus for treating liquid fuel in an internal combustion engine which may be installed rapidly without any significant modification of the existing engine.

These and other objects of the invention will become apparent from the detailed description with reference to the appropriate drawings.

SUMMARY OF THE INVENTION

In a combustion process wherein a liquid fuel and an oxygen-containing gas is first mixed and then ignited, a method for treating the fuel just prior to mixing it with the gas comprising providing an elongated magnet having at least three longitudinally spaced apart sections of alternating north and south polarity, which magnet is sheathed in a non-magnetic material, and flowing the liquid fuel over the sheathed magnet in a direction substantially parallel to its longitudinal axis.

The apparatus comprises an elongated hollow outer casing made of a magnetic material, an elongated inner casing made of a non-magnetic material positioned within the outer casing, a single elongated magnet received in the inner casing, said magnet having at least three longitudinally spaced apart sections of alternating north and south polarity, means for supporting the inner casing in spaced relation to the outer casing to form an annular chamber therebetween, and inlet and outlet means connected to the fuel line for providing fluid flow from the fuel line through the annular chamber, the inlet and outlet means being located near opposite ends of the annular chamber.

DETAILED DESCRIPTION OF THE PREFERRED EMBODIMENT

Figure 1:
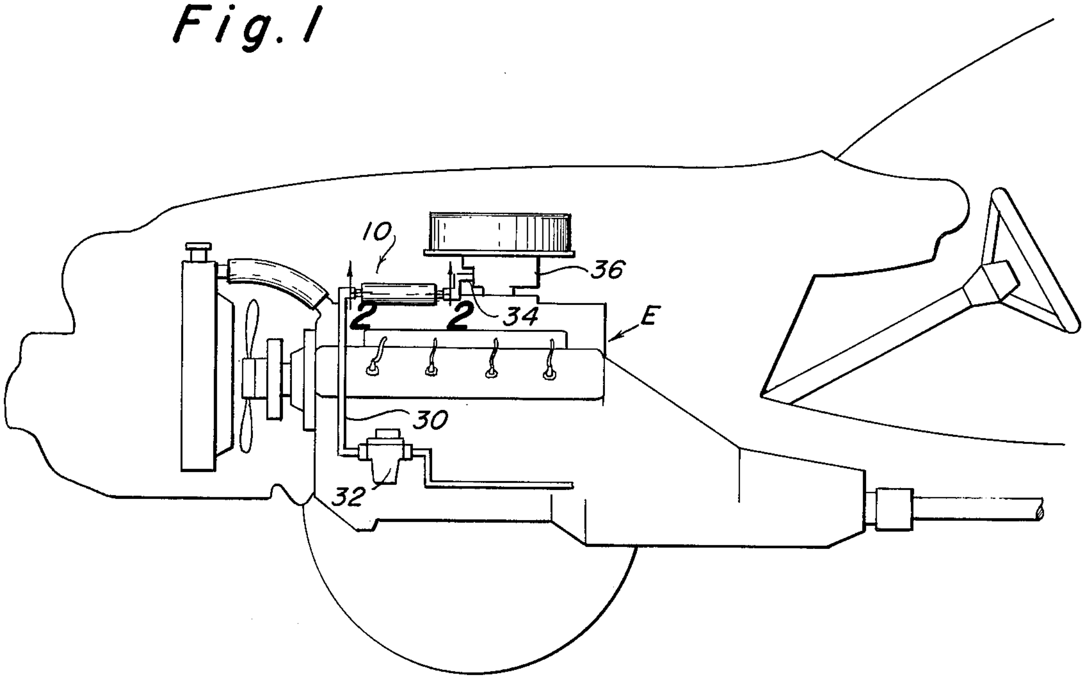
FIG. 1 is a side elevation view of a typical automobile internal combustion engine showing the fuel treating device of the present invention installed thereon.

Referring to the drawings, the fuel treating device 10 comprises an elongated tubular outer member 12, a concentric sleeve 14 and a concentric inner casing 16. Outer member 12, which is preferably made of a non-magnetic material such as copper or a material having a low magnetic permeability, is provided with internal annular recesses 18 and 20 adapted to receive flanged end fittings 22 and 24. Fittings 22 and 24 include reduced diameter portions 26 and 28 which are preferably knurled or stepped to frictionally engage the rubber fuel line 30 connecting with the fuel pump 32 and the fuel line 34 leading to the carburetor 36. Fittings 22 and 24 may be threadedly attached to outer member 12 or, alternatively, permanently joined as by soldering or brazing.

Figure 2:
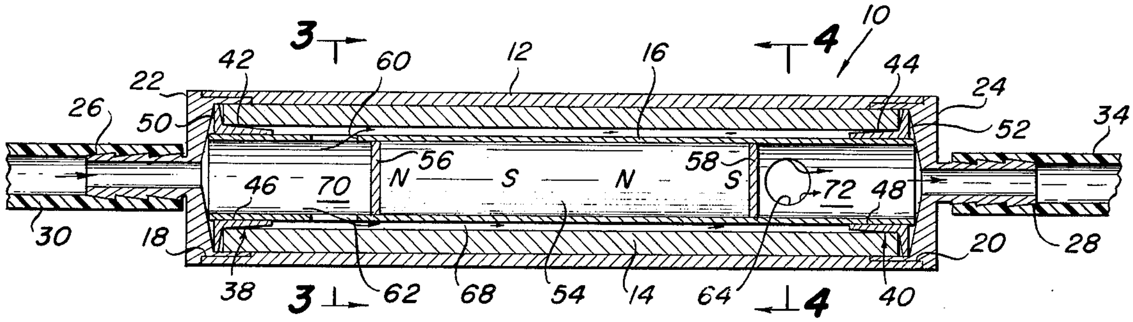
FIG. 2 is an enlarged sectional view of the fuel treating device illustrated in FIG. 1 taken along line 2—2 and viewed in the direction of the arrows.
Figure 3:
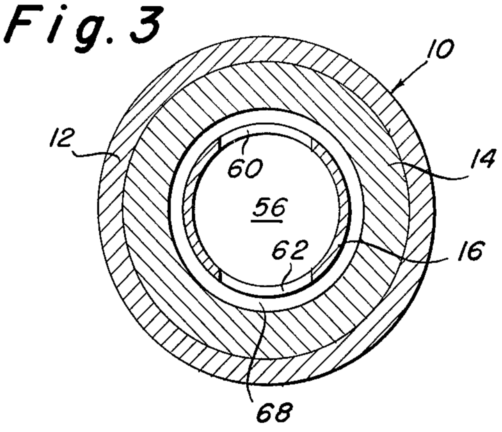
FIG. 3 is an enlarged sectional view of the fuel treating device illustrated in FIG. 2 taken along line 3—3 and viewed in the direction of the arrows.
Figure 4:
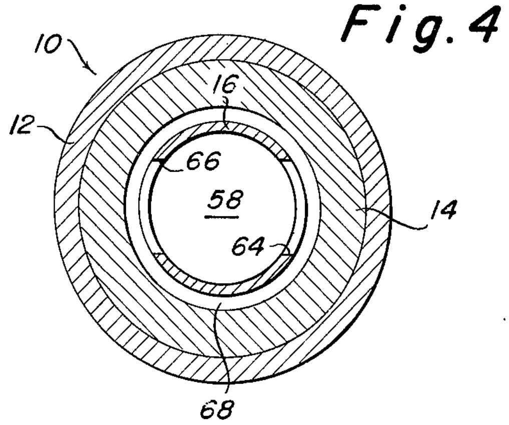
FIG. 4 is an enlarged sectional view of the fuel treating device illustrated in FIG. 2 taken along line 4—4 and viewed in the direction of the arrows.

Sleeve 14, which is made of a ferromagnetic material having a high magnetic permeability such as iron or steel, has an outer diameter approximately equal to the inner diameter of outer member 12 so that it fits tightly thereagainst. Sleeve 14 is longitudinally dimensioned relative to end fittings 22 and 24 and outer member 12 so that inserts 38 and 40 may be received therein as illustrated in FIG. 2. The inserts 38 and 40 comprise annular tapered portions 42 and 44 having cylindrical inner surfaces 46 and 48 in tight engagement with inner casing 16, and flanges 50 and 52 which are forced against sleeve 14 by end fittings 22 and 24. Inserts 50 and 52 are preferably made of a non-magnetic material such as brass.

Inner casing 16 is of substantially tubular configuration and made of a non-magnetic material such as copper or a material of very low permeability. For the purpose of the application, the term "non-magnetic" refers to materials having no magnetic characteristics or materials having very weak magnetic characteristics such as paramagnetic materials. Positioned within inner casing 16 is a permanent magnet preferably having a composition of cobalt, nickel, aluminum, copper and iron and magnetized along its longitudinal axis to have a plurality of successive magnetic domains of alternating alignment; that is, the magnetic inductions of each domain oppose one another so that there exist a plurality of longitudinally spaced-apart poles of alternating polarity. This magnetization of alternating north and south sections along the longitudinal axis of the magnet is indicated by the symbols "N" and "S." With this pole configuration, if an imaginary section were to be taken at any point along the longitudinal axis of the magnet 54, substantially identical pole conditions would be present at any point within the cross section. The magnet having this configuration may be produced by simultaneously impressing magnetic fields of longitudinally alternating polarities on an unmagnetized bar magnet material by means of electromagnets for a period of time and then simultaneously removing the fields.

In order to seal the magnet 54 from the liquid flowing through the device 10, a pair of end walls 56 and 58, preferably made of the same material as inner casing 16, are provided. The end walls 56 and 58 may be integral with inner casing 16 or joined thereto by brazing, soldering, etc. Inner casing 16 is provided with two pairs of opposed openings 60, 62 and 64, 66 near its distal ends, the two pairs of openings being angularly offset from each other by 90°.

Inner casing 16 is supported in spaced relation to sleeve 14 by means of inserts 38 and 40 so as to form an annular chamber 68 therebetween. By virtue of this configuration, a fluid path is provided through hose connecting portion 26 of end fitting 22, the tubular distal portion 70 of inner casing 16, openings 60 and 62, annular chamber 68, openings 64 and 66, the distal tubular portion 72 of inner casing 16, and the hose connecting portion 28 of end fitting 24. The direction and path of fuel flow through the device 10 is indicated generally by the arrows in FIG. 2.

The treatment of the fuel occurs within the annular portion of chamber 68 between the magnet 54 and the sleeve 14. By virtue of the magnetic properties of sleeve 14 and its close proximity to magnet 54, the lines of flux passing through annular chamber 68 have a substantially radial direction as well as a high flux density.

Referring now to FIG. 1, the fuel treating device is connected between the fuel pump 32 and the carburetor 36 and is preferably connected as close to the inlet of the carburetor 36 as possible. Although not illustrated, the device 10 may also be used in conjunction with a diesel engine by connecting it in the fuel line prior to the fuel filter and the fuel injectors or between the fuel filter and the fuel pump. In each case, the important consideration is that the fuel be treated prior to its reaching the air/fuel mixing apparatus such as the carburetor or fuel injectors. The device 10 may also be used in conjunction with other liquid fuel burning equipment such as turbines and furnace burners.

When the device 10 is connected to an internal combustion engine E as shown, the liquid fuel flows from fuel pump 32 through device 10 as previously described and into carburetor 36. As the fuel flows through annular chamber 68, it is subjected to the high density, substantially radial magnetic field produced by magnet 54. Although the effect of the magnetic field on the fuel is not fully understood, it is believed that this treatment causes the vaporized fuel to disperse more rapidly once it enters the expanded area of the combustion chamber thereby causing more complete combustion resulting in greater fuel efficiency and performance and a lessening of exhaust emissions.

Although the fuel treating device has been shown and described as having an overall shape which is symmetrical about a straight axis, it should be noted that other configurations are not excluded. Furthermore, the magnet 54 may be made of any material which has a high energy product and a high retentivity and coercinity such as an Alnico material, high carbon steels, and other steel alloys. While the sleeve 14 is preferably made of iron or steel, it may be made of any material having good magnetic properties and a high permeability which provides a good path for completing the magnetic circuit of magnet 54 thereby concentrating the magnetic field within the annular chamber. In the preferred embodiment, a magnet having four pole sections is employed but it has been found that a magnet having a N-SS-N or S-NN-S configuration will also be effective.

While this invention has been described as having a preferred design, it will be understood that it is capable of further modification. This application is, therefore, intended to cover any variations, uses, or adaptations of the invention following the general principles thereof and including such departures from the present disclosure has come within known or customary practice in the art to which this invention pertains, and as may be applied to the essential features hereinbefore set forth and fall within the scope of this invention or the limits of the appended claims.

What is claimed is:

1. In an internal combustion engine including fuel/air mixing means and a fuel supply line in fluid communication with said mixing means, a fuel treating device in said fuel line, said device comprising:

an elongated hollow outer casing made of a magnetic material, an elongated inner casing made of a non-magnetic material positioned within said outer casing, a single elongated magnet received in said inner casing, said magnet being magnetized along its longitudinal axis and having at least two successive magnetic domains of alternating alignment so that there exist at least three longitudinally spaced apart sections of alternating north and south polarity, means for supporting said inner casing in spaced relation to said outer casing to form an annular chamber therebetween, inlet and outlet means connected to said fuel line for providing fluid flow from said fuel line through said annular chamber, said inlet and outlet means being located near opposite ends of said annular chamber.

2. The apparatus of claim 1 wherein said outer casing, said inner casing and said magnet are cylindrical and mutually concentric.

3. The apparatus of claim 1 wherein said outer casing is of two-piece construction including an outer jacket and an inner sleeve, said inner sleeve being made of a magnetic material of high permeability.

4. The apparatus of claim 3 wherein said outer jacket is made of a non-magnetic material.

5. The apparatus of claim 3 wherein said sleeve is made of a ferromagnetic material.

6. The apparatus of claim 5 wherein said sleeve is steel.

7. The apparatus of claim 1 wherein said inner casing is made of copper.

8. The apparatus of claim 1 wherein said means for supporting said inner casing includes a pair of flanged insert members positioned about said inner casing at the distal ends thereof.

9. The apparatus of claim 1 and wherein said magnet is sealed within said inner casing.

10. The apparatus of claim 1 wherein said annular chamber is substantially free from obstructions.

11. The apparatus of claim 1 wherein substantially identical pole conditions extend transversely in said magnet.

12. The apparatus of claim 1 wherein said magnet has three or more successive magnetic domains of alternating alignment so that there exist at least four longitudinally spaced apart sections of alternating north and south polarity.

13. In a hydrocarbon fuel burning internal combustion engine including fuel/air mixing means and a fuel supply line in fluid communication with said mixing means, a hydrocarbon fuel treating device in said fuel line, said device comprising:

an elongated hollow outer casing made of a magnetic material, an elongated inner casing made of a non-magnetic material positioned within said outer casing, a single elongated magnet received in said inner casing, said magnet being magnetized along its longitudinal axis and having at least two successive magnetic domains of alternating alignment so that there exist at least three longitudinally spaced apart sections of alternating north and south polarity, means for supporting said inner casing in spaced relation to said outer casing to form an annular chamber therebetween, inlet and outlet means connected to said fuel line for providing fluid flow from said fuel line through said annular chamber, said inlet and outlet means being located near opposite ends of said annular chamber.

14. In a combustion process wherein a liquid fuel and an oxygen-containing gas are first mixed and then ignited, a method for treating the fuel just prior to mixing it with the gas comprising:

flowing liquid fuel over an elongated magnet in a direction substantially parallel to the longitudinal axis of said magnet, said magnet being magnetized along its longitudinal axis and having at least two successive magnetic domains of alternating alignment so that there exist at least three longitudinally spaced apart sections of alternating north and south polarity.

* * * * *